US012631473B2

(12) United States Patent
Ferret et al.

(10) Patent No.: US 12,631,473 B2
(45) Date of Patent: May 19, 2026

(54) METHOD AND DEVICE FOR CALIBRATING AN ENVIRONMENT DEPTH SENSOR

(71) Applicant: Continental Autonomous Mobility Germany GmbH, Ingolstadt (DE)

(72) Inventors: Gatien Ferret, Toulouse (FR); Bilal Hijazi, Toulouse (FR); Joaquin Cornejo Bautista, Toulouse (FR)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 227 days.

(21) Appl. No.: 18/280,834

(22) PCT Filed: Mar. 8, 2022

(86) PCT No.: PCT/EP2022/055810
§ 371 (c)(1),
(2) Date: Sep. 7, 2023

(87) PCT Pub. No.: WO2022/189389
PCT Pub. Date: Sep. 15, 2022

(65) Prior Publication Data
US 2024/0159567 A1      May 16, 2024

(30) Foreign Application Priority Data

Mar. 9, 2021     (FR) ...................................... 2102300

(51) Int. Cl.
*G01S 7/497*      (2006.01)
*G01C 21/20*      (2006.01)
*G01C 25/00*      (2006.01)

(52) U.S. Cl.
CPC ............. *G01C 25/00* (2013.01); *G01C 21/20* (2013.01)

(58) Field of Classification Search
CPC ......... G01C 25/00; G01C 21/20; G01S 7/403; G01S 13/89; G01S 13/931; G01S 17/89;
(Continued)

(56) References Cited

U.S. PATENT DOCUMENTS 9,792,683 B2      10/2017  Bone et al.
2015/0362587 A1   12/2015  Rogan et al.
(Continued)

FOREIGN PATENT DOCUMENTS

CN          110596664 A      12/2019
JP          H10-132939 A      5/1998
(Continued)

OTHER PUBLICATIONS

Keyetieu, Automatic Data Selection and Boresight Adjustment of LiDAR Systems; May 2013.*
(Continued)

*Primary Examiner* — Robert R Raevis
(74) *Attorney, Agent, or Firm* — Buchanan Ingersoll & Rooney PC

(57)          ABSTRACT

A device and method for calibrating the yaw angle of an environment depth sensor borne by a vehicle, which includes: a step of storage of data regarding planar surfaces identified by the environment depth sensor, these data including at least information regarding the orientation of the planar surfaces; a step of statistical analysis of the data stored in the database, able to identify a predominant planar-surface orientation, this orientation being parallel to the vertical plane passing through the longitudinal axis of the vehicle, or perpendicular to the longitudinal axis of the vehicle; a step of computation of a calibration angle, made between this predominant planar-surface orientation, parallel to the vertical plane passing through the longitudinal axis
(Continued)

of the vehicle, or perpendicular to the longitudinal axis of the vehicle, and the environment depth sensor.

11 Claims, 3 Drawing Sheets

(58) Field of Classification Search
CPC ... G01S 17/931; G01S 7/4972; G01B 21/042;
G01B 21/045
USPC ................. 356/399–401, 614, 622, 243.1, 3,
356/5.01–5.8; 73/1.01, 1.75; 702/104,
702/97, 92, 90, 91
See application file for complete search history.

(56) References Cited

U.S. PATENT DOCUMENTS

| | | | |
|---|---|---|---|
| 2018/0231654 A1 | 8/2018 | Bilik et al. | |
| 2019/0146067 A1 | 5/2019 | Leppin et al. | |
| 2019/0392228 A1 | 12/2019 | Zhu et al. | |
| 2021/0247506 A1* | 8/2021 | Knutson | G01S 7/4808 |

FOREIGN PATENT DOCUMENTS

| | | | |
|---|---|---|---|
| JP | 2001-166051 A | 6/2001 | |
| JP | 2007-298409 A | 11/2007 | |
| JP | 2008-076252 A | 4/2008 | |
| JP | 2009-042147 A | 2/2009 | |
| JP | 2015072269 A | 4/2015 | |
| WO | 2007/015288 A1 | 2/2007 | |
| WO | 2018142057 A1 | 8/2018 | |

OTHER PUBLICATIONS

Keyetieu, R. et al., "Automatic Data Selection and Boresight Adjustment of LiDAR Systems", Remote Sensing, Molecular Diversity Preservation International (MDPI), May 1, 2019, vol. 11(9), 18 pages, XP009531303.

Zhu, Z. et al., "Unsupervised Extrinsic Parameters Calibration for Multi-beam LiDARs", Proceedings of the 2nd International Conference on Computer Science & Electronics Engineering (ICCSEE 2013), Jan. 1, 2013, pp. 1110-1113, XP055861336, retrieved from the Internet: https://www.atlantis-press.com/article/4709.pdf>.

Brückner, M. et al., "Exploiting the Manhattan-world Assumption for Extrinsic Self-Calibration of Multi-modal Sensor Networks", Computer Vision (ICCV), 2011 IEEE International Conference on Computer Vision, Nov. 6, 2011, pp. 945-950, XP032093726.

Elseberg, J. et al,. "Algorithmic Solutions for Computing Precise Maximum Likelihood 3D Point Clouds from Mobile Laser Scanning Platforms", Remote Sens, 2013, vol. 5, pp. 5871-5906.

Nouira, H. et al., "Point Cloud Refinement with Self-Calibration of a Mobile Multibeam Lidar Sensor", Photogrammetric Record, 2017, 32(159), 26 pages, HAL Id: hal-01695870, https://hal-mines-paristech.archives-ouvertes.fr/hal-01695870.

Levinson, J. et al., "Unsupervised Calibration for Multi-beam Lasers", Nov. 5, 2018, 8 pages.

French Search Report for French Application No. 2102300, dated Nov. 18, 2021 with translation, 18 pages.

International Search Report and Written Opinion for International Application No. PCT/EP2022/055810, mailed Jun. 24, 2022, 11 pages.

Office Action (Notice of Reasons for Refusal) issued Nov. 13, 2025, by the Japan Patent Office in corresponding Japanese Patent Application No. 2023-555411 and an English translation of the Office Action. (8 pages).

* cited by examiner

METHOD AND DEVICE FOR CALIBRATING AN ENVIRONMENT DEPTH SENSOR

CROSS REFERENCE TO RELATED APPLICATIONS

This application is the U.S. National Phase Application of PCT International Application No. PCT/EP2022/055810, filed Mar. 8, 2022, which claims priority to French Patent Application No. 2102300, filed Mar. 9, 2021, the contents of such applications being incorporated by reference herein.

DESCRIPTION

Field of the Invention

The technical field of the present invention is that of calibration of environment depth sensors mounted on vehicles.

Background of the Invention

Vehicles are commonly equipped with environment depth sensors, making it possible to detect obstacles situated around the vehicle and, more generally, all the objects situated around the vehicle. Depending on the vehicle, these sensors may be used for parking assistance, to generate alerts in the event of the presence of another vehicle in the blind spot of the rear-view mirror, to carry out emergency braking in the event of the presence of an obstacle in front of the vehicle, or even to enable autonomous driving of the vehicle.

Environment depth sensors are most often radars. They may also be lidars, with which a depth measurement is obtained by measuring the return time of light reflected by the environment, after emission of the light. It is thus known to use flash lidars on vehicles, flash lidars emitting a multidirectional flash of light, in the near infrared, and analyzing the return time of the reflected light, in a plurality of directions. Such a flash lidar is for example described in the document US2019146067A1, incorporated herein by reference.

Other types of environment depth sensors are known. For example, scanning lidars are known, in which a laser beam scans an area of the environment. Radars, sonars or stereo cameras are also known, making it possible to determine the depth of objects situated in the environment of the vehicle.

An aspect of the present invention may be applied to all types of environment depth sensors mounted on vehicles, in particular, but not exclusively, sensors of the types mentioned above.

The position of the environment depth sensors, with respect to the vehicle on which they are mounted, must be precisely known for the position, with respect to the vehicle, of objects detected in the environment by these sensors to be able to be reliably determined. The term "position of a sensor with respect to the vehicle", in the present patent application, designates both the location on the vehicle where the sensor is mounted, and the angular position of this sensor with respect to the vehicle. Occasionally, however, vehicle or sensor manufacturing tolerances may cause slight variations in the position of a sensor with respect to the vehicle. In other cases, a maintenance operation, or an impact suffered by the vehicle, may cause the sensor to move.

It is therefore not possible to know precisely, in real time, the exact position of the environment depth sensor with respect to the vehicle. Such uncertainty is particularly detrimental with regard to the yaw angle of the sensor, that is to say the angle that the sensor makes to the vehicle in a horizontal plane. Specifically, an offset, even a small one, between the actual yaw angle of the sensor and the theoretical yaw angle thereof used by the computing means that process the data from this sensor, to deduce the position of objects around the vehicle, may lead to a substantial shift in the computed position of an object, with respect to its real position.

There is therefore a need to know with precision the position of an environment depth sensor, with respect to the vehicle on which it is mounted, and particularly the yaw angle that it makes to this vehicle.

This position is commonly measured in a calibration step, during which the environment depth sensor detects the position of a test pattern having characteristic points, the position of which with respect to the vehicle is known with precision. The data from this detection make it possible to know with precision the yaw angle of the sensor.

Such a calibration is usually carried out at the end of the vehicle's manufacture (in other words: "end of line" calibration). Besides the fact that it adds a step to the manufacture of the vehicle, this calibration does not allow the detection of a subsequent variation in the position of the sensor with respect to the vehicle, for example due to a shock, vibrations or a maintenance operation. A change in the position of the sensor may then occur, which may only be detected later, when the vehicle is serviced.

The document "Automatic data selection and boresight adjustment of LiDAR systems", Rabine Keyetieu and Nicolas Seube, Jul. 5, 2019, MDPI, incorporated herein by reference, describes a method for automatically calibrating the boresight angles of a LiDAR and an inertial measurement unit that is especially applied to a drone, and that is based on construction of a boresight error observability criterion, and automatic selection of the points most sensitive to boresight errors in order to allow adjustment of boresight angles on the basis of a statistical analysis of the adjustment results.

Although this method provides a so-called "on-line" automatic calibration, or in other words not a so-called "end of chain" calibration, it still requires an inertial measurement unit composed of three accelerometers and of three gyrometers, optionally hybridized with a GNSS system, and hence implementation of this calibrating method is costly and complex.

SUMMARY OF THE INVENTION

An aspect of the present invention aims to overcome these drawbacks of the prior art.

In particular, an aspect of the present invention is to allow calibration of the position of an environment depth sensor with respect to a vehicle on which it is mounted, making it possible to know the precise angular position of this sensor with respect to the vehicle.

Another aspect of the invention aims to allow such calibration throughout the use of the vehicle, in order to rapidly detect a modification of the position of the sensor with respect to the vehicle.

Yet another aspect of the invention aims to enable such a calibration to be carried out with sensors the precision and resolution of which are limited, and using only relatively low computing power.

One particular aspect of the invention aims to allow such a calibration to be carried out by a computer of relatively moderate power, able to be implemented in a vehicle at a reasonable cost.

These aspects, as well as others that will appear more clearly below, are achieved according to an aspect of the invention by a method for calibrating the yaw angle of an environment depth sensor borne by a vehicle, which comprises, according to an aspect of the invention, the following steps implemented simultaneously, continuously:

a step of storage, in a database, of data regarding planar surfaces identified by an environment depth sensor, these data comprising at least information regarding the orientation of the planar surfaces, with respect to the environment depth sensor;

a step of statistical analysis of these data stored in the database, during which a predominant planar-surface orientation is identified among the data;

a step of computation of a calibration angle, made between the predominant planar-surface orientation and the environment depth sensor.

Thus, the calibration is carried out continuously while the vehicle is moving, based on planar surfaces in the environment through which the vehicle is moving. Such a calibration is more advantageous than the calibrations of the prior art, which had to be carried out occasionally, using a test pattern.

Preferably, this method also comprises, before the data storage step, a step of preliminary selection of data delivered by an environment depth sensor, during which the relevant data to be stored in the database are selected depending on predefined criteria.

It should be noted that although this step is located before the data storage step, in the logical sequence of the steps of the method, it is implemented simultaneously with the other steps of the method and continuously.

Preferably, this method also comprises, before the step of statistical analysis of the data, a step of association of at least one weighting coefficient with the data regarding each of the planar surfaces, stored in the database.

It should be noted that although this step is located before the step of statistical analysis of the data, in the logical sequence of the steps of the method, it is implemented simultaneously with the other steps of the method and continuously.

Advantageously, this step of association of at least one weighting coefficient comprises a step of determination of at least one weighting coefficient, depending on data delivered by:

the environment depth sensor, the vehicle, an analysis of the data regarding other planar surfaces stored in the database, or the previously identified predominant planar-surface orientation.

Preferably, during the statistical analysis step, the predominant planar-surface orientation is identified as the orientation obtaining a maximum score, this score being defined depending on the number of planar surfaces, the data of which have been stored, that have this angular orientation or a similar orientation, weighted by at least one weighting coefficient associated with these data.

According to one advantageous embodiment, during the statistical analysis step, the predominant planar-surface orientation is identified as the average orientation of planar surfaces the data of which are associated with the most favorable weighting coefficients.

An aspect of the invention also relates to a device for calibrating the yaw angle of an environment depth sensor, comprising:

means for storing data delivered by an environment depth sensor, these data comprising at least information regarding the orientation, with respect to the environment depth sensor, of planar surfaces identified by the sensor;

means for performing statistical analysis that are able to identify a predominant planar-surface orientation among the data stored in the storing means;

means for computing a calibration angle, made between the predominant planar-surface orientation and the environment depth sensor.

Preferably, this device comprises means for achieving preliminary selection of the data delivered by an environment depth sensor, which are able to select, depending on predefined criteria, the relevant data to be stored in the storing means.

Lastly, an aspect of the invention relates to a processor-readable data medium on which is stored a computer program comprising instructions for executing the steps of a calibrating method such as described above.

BRIEF DESCRIPTION OF THE DRAWINGS

Other features, advantages and details of aspects of the invention will become more apparent on reading the remainder of the following description with reference to the drawings, in which.

DETAILED DESCRIPTION OF THE PREFERRED EMBODIMENTS

Environment Depth Sensors

Figure 1:
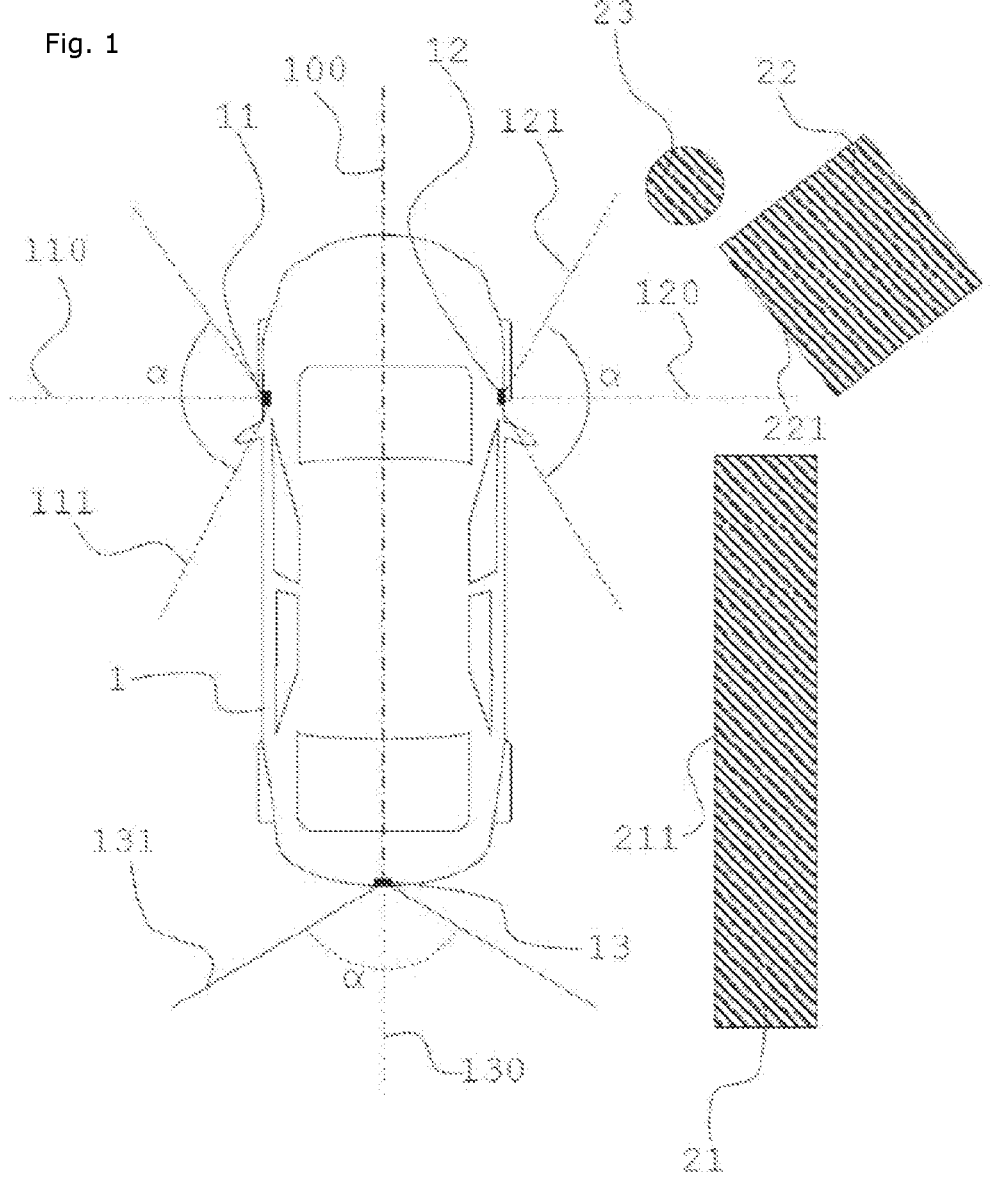
FIG. 1 is a schematic top view of a vehicle equipped with environment depth sensors, and of objects in its environment.

FIG. 1 is a schematic top view of a vehicle 1 equipped with three environment depth sensors. A left side sensor 11, located close to the left side mirror of the vehicle 1, is oriented laterally to the left. A right side sensor 12, located close to the right side mirror of the vehicle 1, is oriented laterally to the right. A rear sensor 13, placed close to the rear bumper of the vehicle 1, is oriented rearward.

In the embodiment shown, these three environment depth sensors are flash-lidar sensors, which emit flashes of light in the near-infrared domain and which, in a given angular field, collect this light reflected by the surrounding objects. Measurement of the return time of the reflected light, for each orientation, makes it possible to know the distance of the objects having reflected this light.

It is possible, in other embodiments, for the sensors 11, 12 or 13 to be positioned at other locations on the vehicle, or to be sensors of a different type, for example scanning lidars, stereoscopic cameras, sonars, radars, or any other type of environment depth sensor known to those skilled in the art.

In the embodiment shown, the three sensors 11, 12 and 13 have an angular detection field 111, 121 and 131, respectively, having an opening of 120° (angle $\alpha$ in FIG. 1) in a horizontal plane and of 30° in a vertical plane. Each of these angular detection fields is centered on a main sensor axis 110, 120 and 130, respectively.

Figure 3:
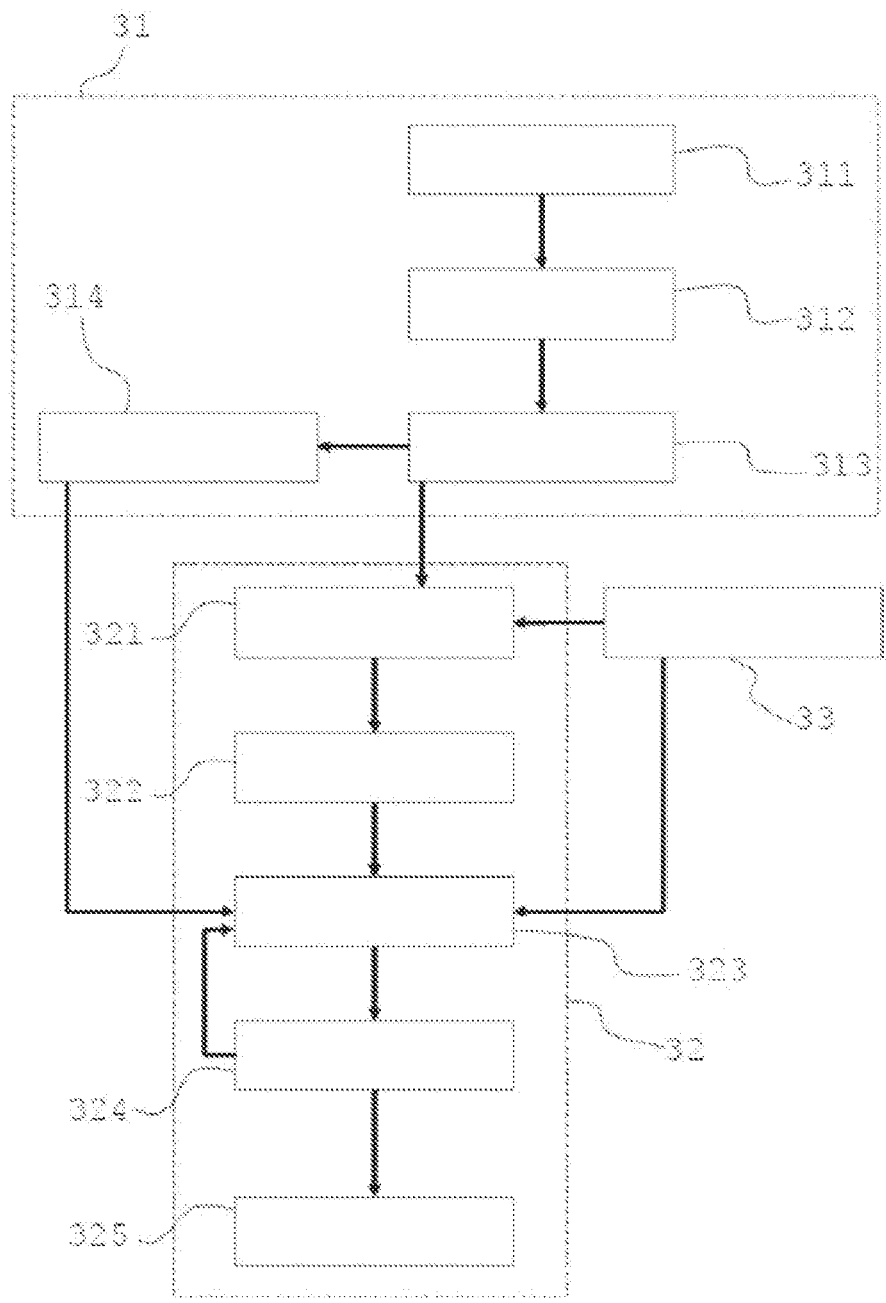
FIG. 3 is a flowchart showing the main steps of a calibrating method according to one embodiment of the invention.

The method for detecting planar surfaces, which has been schematically represented by a rectangle 31 in FIG. 3, is implemented by an environment depth sensor. An environment depth sensor is considered, in the present patent application, to be a device capable of collecting data regarding the separation of surfaces, and comprising computing means suitable for processing these data in order to generate information on the depth of the objects in the environment. By the expression "computing means", what is meant in the present description is a processor, a calculator, an automaton, a computer or a set of computers, or any other equivalent means allowing the data to be processed.

In the situation shown in FIG. 1, the vehicle 1 is close to three objects: a parallelepipedal object 21, one face 211 of which is parallel to the longitudinal axis 100 of the vehicle 1, a second parallelepipedal object 22, no face of which is parallel to the longitudinal axis 100 of the vehicle 1 and a third object 23 having no planar face. These three objects are located in the angular detection field 121 of environment depth sensor 12.

Figure 2:
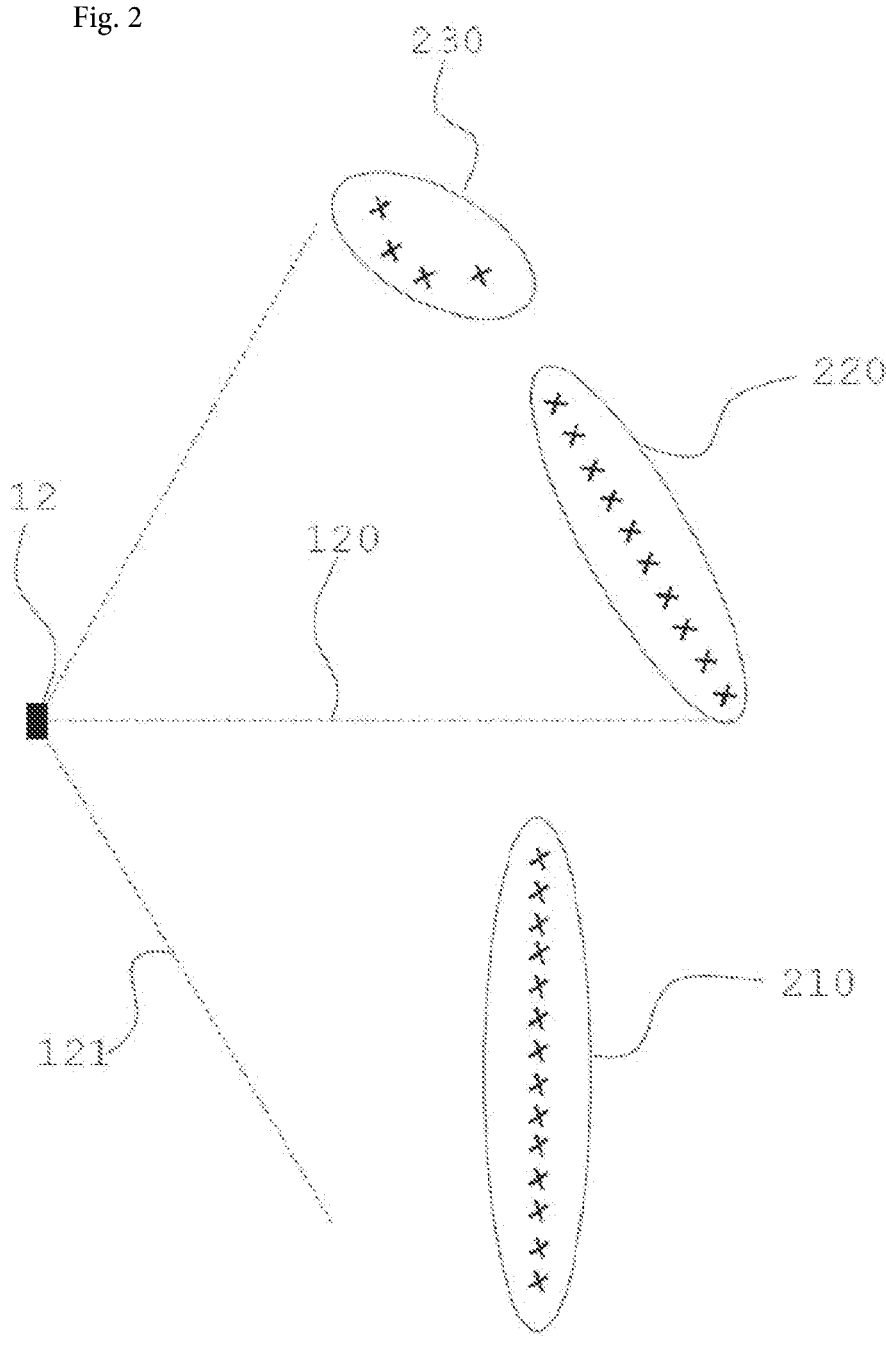
FIG. 2 is a schematic representation of the data measured by one of the environment depth sensors of the vehicle of FIG. 1.

FIG. 2 schematically shows the form in which the environment depth sensor 12 detects these three objects. This sensor 12 measures the position of a plurality of points of surfaces that reflect the flash of light that it emits. FIG. 2 thus shows, in a horizontal plane, points 210 corresponding to detection by the sensor 12 of the surface 211 of the object 21, points 220 corresponding to the detection by the sensor 12 of the surface 221 of the object 22 and points 230 corresponding to the detection by the sensor 12 of the surface of the object 23. Of course, in fact, the sensor 12 measures the position of such points in three dimensions, and not only in two dimensions as schematically shown in FIG. 2.

This step of measuring the position of points 210, 220 and 230 of surfaces in the environment, with respect to the sensor 12, is carried out by the sensor 12 throughout its use, at a frequency of a plurality of measurements per second. This step, which has been represented by the rectangle 311 in FIG. 3, forms part of the method 31 for detecting planar surfaces, the steps of which are preferably implemented simultaneously, continuously.

Since the position of these points is known, a plurality of mathematical processing steps are carried out by the environment depth sensor 12.

During a first processing step, usually called the clustering step, various points are grouped together into a group, or cluster, corresponding to an object or a surface. In this step, points corresponding to detection of the road or ground are usually eliminated, these points being identified using information on the height of the points and the substantially horizontal orientation of the surface containing these points. Points that do not belong to the road or ground are then clustered using a mathematical three-dimensional neighborhood search. In the embodiment shown in FIG. 2, this step may for example make it possible to cluster the points 210 in one cluster, the points 220 in another cluster and the points 230 in another cluster.

This clustering step, which has been represented by the rectangle 312 in FIG. 3, also forms part of the method 31 for detecting planar surfaces.

During a second processing step, a search for planar surfaces is carried out for each of the clusters of points obtained. Such a search may be carried out using a RANSAC algorithm (RANSAC being the abbreviation of "RANdom SAmple Consensus") which searches, in the cluster of points, for a maximum of points corresponding to a plane extracted from a sub-sample of these points.

The plane thus found, which contains the most points, is then refined using a numerical optimization method considering these points. This optimization may for example be implemented using an SVD method (SVD being the abbreviation of "Singular Value Decomposition"). It should be noted that the planes identified are not necessarily vertical planes.

During application of this step of searching for planar surfaces, which has been shown in the example of FIG. 2, the set of points 210 may allow a plane, corresponding to the planar surface 211 of the object 21, to be identified. The set of points 220 may allow another plane, corresponding to the planar surface 221 of the object 22, to be identified. The set of points 230, in contrast, does not allow a plane to be identified.

This step of searching for planar surfaces, which has been represented by the rectangle 313 in FIG. 3, also forms part of the method 31 for detecting planar surfaces.

These steps of measuring the position of points, of clustering and of searching for planar surfaces are commonly executed by the environment depth sensor. It is also possible, in other embodiments, for an environment depth sensor to execute these steps in association with external computing means, or for it to obtain an identification of the planar surfaces of the objects in the environment by implementing steps different from those described above.

In order for the measurements of the environment depth sensors 11, 12 and 13 to be able to allow the vehicle 1 to know with precision the position of the objects in its environment, it is necessary to know precisely the position of each of these sensors with respect to the vehicle 1. More precisely, it is particularly important to know with precision the yaw angle of each of these sensors, that is to say the angle made, in a horizontal plane, between the longitudinal axis 100 of the vehicle and the main axis 110, 120 and 130 of each sensor, respectively.

To this end, the vehicle 1 is advantageously equipped with an environment-depth-sensor calibrating device, which is able to implement an environment-depth-sensor calibrating method, which has been schematically represented by the rectangle 32 in FIG. 3, and the steps of which are preferably implemented simultaneously, continuously.

The inventors have identified that vehicles very often move parallel to planar surfaces such as building walls, or perpendicular to planar surfaces such as traffic signs and particularly signs located above roads, or the rear faces of trucks traveling in front of the vehicle. The provided calibrating method and calibrating device make it possible to take advantage of this fact to calibrate the angular position of the environment depth sensors with respect to the vehicle 1, continuously, during the movement of the vehicle, by referring to these surfaces parallel or perpendicular to the vehicle.

This method for calibrating the environment depth sensor may be implemented based on information regarding the identified planar surfaces that is delivered by the environment depth sensor, independently of the method used to obtain this information. It is preferably implemented by a calibrating device, which may consist of software operating on the computing means of the sensor, or on dedicated computing means, or even on any other computing means, such as the on-board computer of the vehicle.

The calibrating method 32 according to an aspect of the invention comprises at least the following steps, which are preferably implemented simultaneously, continuously:

a step 322 of data storage, a step 324 of statistical analysis of the data, a step 325 of computation of the calibration angle.

During the data storage step, which has been represented by the rectangle 322 in FIG. 3, the calibrating device stores, in a database, data regarding planar surfaces identified by the environment depth sensor, and in particular information regarding the orientation of these planar surfaces with respect to the sensor. This data storage step may advantageously last the entire time of operation of the sensor to be calibrated.

From the moment when the data corresponding to a sufficient number of planar surfaces have been stored in the database, the calibrating device implements a statistical analysis step, which has been represented by the rectangle 324 in FIG. 3. This step aims to identify, among the stored data, a predominant planar-surface orientation.

During this step, the device may thus sort the planar surfaces, the data of which have been stored, depending on the angular orientation of these planar surfaces with respect to the sensor, and search for a predominant planar-surface orientation among the planar surfaces the data of which have been stored.

This predominant orientation may be, for example, an orientation corresponding, with a determined tolerance, to a number of planar surfaces significantly higher than the other orientations.

According to one embodiment, this statistical analysis may consist in identifying a set of planar surfaces having substantially the same orientation with respect to the sensor, and likely to be parallel to the longitudinal axis of the vehicle, and in computing the average of the orientations of the identified planar surfaces. This average may then be considered to correspond to the predominant planar-surface orientation.

According to the observations of the inventors, this predominant planar-surface orientation most often corresponds to an orientation parallel to the vertical plane passing through the longitudinal axis of the vehicle, and, in certain cases, to an orientation perpendicular to the longitudinal axis of the vehicle.

Thus, during the step 324 of statistical analysis of said data stored in said database, during which a predominant planar-surface orientation is identified among said data, this orientation may therefore be parallel to the vertical plane passing through the longitudinal axis of the vehicle 1, or perpendicular to the longitudinal axis of the vehicle 1.

Thus, the predominant planar-surface orientation identified, which is either parallel to the vertical plane passing through the longitudinal axis of the vehicle 1, or perpendicular to the longitudinal axis of the vehicle 1, forms the reference orientation in the rest of the calibration of the yaw angle of the environment depth sensor borne by the vehicle 1.

One of the reference orientations, among the orientation parallel to the vertical plane passing through the longitudinal axis of the vehicle 1 and the orientation perpendicular to the longitudinal axis of the vehicle 1, is selected depending on the nominal position of the environment depth sensor on said vehicle.

The calibrating device may then implement a step of computation of the calibration angle, which has been represented by the rectangle 325 in FIG. 3. This step consists, based on the detected predominant planar-surface orientation, which is either parallel to the vertical plane passing through the longitudinal axis of the vehicle 1, or perpendicular to the longitudinal axis of the vehicle 1, in computing the calibration angle, which is defined to be the angular orientation of the sensor with respect to the vehicle. To implement this step, the predominant planar-surface orientation is presumed to be parallel to the vertical plane passing through the longitudinal axis of the vehicle, or perpendicular to the longitudinal axis of the vehicle in the particular cases where the steps of the method are specifically tailored to identify a predominant planar-surface orientation perpendicular to the vehicle.

According to preferred embodiments, the calibrating method may comprise additional steps, to take into account data other than the information regarding the orientation of the identified planar surfaces. It is thus possible to identify more reliably and efficiently, during the statistical analysis step, a predominant planar-surface orientation presumed parallel to the vertical plane passing through the longitudinal axis of the vehicle, or presumed perpendicular to the longitudinal axis of the vehicle.

Thus, the calibrating method 32, according to the preferred embodiment shown in FIG. 3, comprises the following steps, which are preferably implemented simultaneously, continuously:

a step 321 of preliminary data selection, a step 322 of data storage, a step 323 of association of weighting coefficients, a step 324 of statistical analysis of the data, a step 325 of computation of the calibration angle.

The calibrating device may thus comprise means for achieving preliminary selection, which implement a step 321 of preliminary selection of the data to be stored in the database. During this step, the device selects data so as to store in the database only data regarding planar surfaces that have the highest probability of having the desired orientation, parallel or perpendicular to the longitudinal axis of the vehicle.

Thus, in the embodiment shown, the device only introduces the data corresponding to a planar surface into the database if this planar surface is detected by the environment depth sensor while the vehicle is traveling in a straight line, at a speed higher than a predetermined threshold speed. Specifically, planar surfaces detected under these conditions have a high probability of being parallel to the longitudinal axis of the vehicle, unlike planar surfaces detected when the vehicle is turning or is maneuvering at low speed.

The information needed to make this selection may be provided, for example, by the on-board computer of the vehicle, by geolocation equipment or by gyroscopic or inertial equipment. The step of obtaining this information has been represented by the rectangle 33 in FIG. 3.

It is also possible, in other embodiments, to use other criteria for the preliminary selection of the data to be introduced into the database.

It is thus possible, for example, to select data regarding the planar surfaces detected in a precise angular zone of the detector, in order to limit the introduced data to data relating to planar surfaces that have the highest probability of having the desired orientation.

It is even possible, for example, to choose not to introduce into the database data of planar surfaces identified in a geographical area that has previously been identified as not having enough planar surfaces parallel to the path of the vehicle.

In the case where calibration of a sensor must be based on recognition of planar surfaces perpendicular to the longitudinal axis of the vehicle, it is possible to make introduction of the data of a planar surface into the database conditional upon specific criteria, for example upon an approximate position of the planar surface with respect to the vehicle, for example in front of the vehicle and at height to identify road signs overhanging the road, and upon an orientation of the plane approximating the expected perpendicular orientation.

This preliminary selection step may be implemented, in the calibrating method, independently of the other additional steps of the embodiment of FIG. 3.

In the preferred embodiment shown in FIG. 3, the calibrating device implements a step of association of weighting coefficients 323 with the stored data. During this step 323, the calibrating device associates, in the database, the data regarding each planar surface with one or more weighting coefficients.

These weighting coefficients are preferably representative of the probability that the planar surface in question has the desired orientation.

Such a weighting coefficient may for example be a quality score for the detected planar surface, making it possible to assess whether the planar surface may form a reliable reference, or whether it has a higher or lower probability of being parallel to the longitudinal axis of the vehicle. This score may be determined by the environment depth sensor and be delivered to the calibrating device at the same time as the data of each planar surface.

Thus, the sensor may determine, for each identified planar surface, a quality score taking into account criteria such as:

the extent of the planar surface, mainly in the horizontal direction and, to a lesser extent, in the vertical direction;

the planarity of the planar surface, obtained by computing the deviation of the position of each point of the planar surface from a theoretical plane;

the proportion of points of the cluster of points belonging to the planar surface.

Thus, in the situation shown in FIGS. 1 and 2, the planar surface corresponding to the surface 211 will potentially be assigned a quality score higher than that of the planar surface corresponding to the surface 221, because of its greater extent.

The step of determination of a quality score for the planar surface, which has been represented by the rectangle 314 in FIG. 3, forms part of the method 31 for detecting planar surfaces.

In other embodiments, it is also possible for the calibrating device itself to compute a score corresponding to the quality of the plane, in particular based on data originating from the sensor.

Another weighting coefficient may be associated with the recentness of the identification of the plane by the sensor. Thus, data corresponding to an older plane may be weighted less than a more recently identified plane. Specifically, when an event has modified the position of a sensor with respect to the vehicle, a more recently identified plane has a higher probability of having an orientation parallel to the vehicle, taking into account the actual position of the sensor, than a previously identified plane.

Such a recentness-related coefficient may potentially be zero for the oldest planar surfaces, preventing their data from being taken into account in the statistical analysis step. It is also possible, in one variant, for the data of the oldest planar surfaces to be deleted from the database.

Such weighting allows more rapid identification of a change in the orientation of the sensor with respect to the vehicle.

Another weighting coefficient may be associated with the situation of the vehicle at the time of identification of the plane.

This coefficient may be higher when the vehicle is in a situation in which it is more likely to be driving beside planar surfaces parallel to its path. Thus, this coefficient will preferably be higher when the vehicle is moving at high speed on a straight path, and lower when the vehicle is moving slowly or on a curved path.

This coefficient may also take into account, in one particular embodiment, the geographical area in which the vehicle is located. It will thus potentially be higher in an area in which it is known that planar surfaces are situated parallel to traffic lanes, or lower in areas in which it is known that few planar surfaces are oriented parallel to traffic lanes.

The information making it possible to generate this weighting coefficient may come from the on-board computer of the vehicle or from a geolocation or navigation system. The step of obtaining this data has been represented by the rectangle 33 in FIG. 3.

Another weighting coefficient may be associated with the consistency of the data corresponding to a planar surface with the data recorded beforehand. Thus, a planar surface having an orientation, with respect to the sensors, distinct from the orientation of the planar surfaces recorded beforehand may be assigned a lower coefficient than a planar surface having the same orientation, with respect to the sensor, as many planar surfaces recorded beforehand. In the same way, a planar surface having too large an angular offset with respect to the predominant planar-surface orientation such as identified beforehand may be assigned a lower coefficient.

Other weighting coefficients may of course be used, in addition to or instead of the weighting coefficients mentioned above, to assess the probability that a planar surface has the desired orientation, parallel to the vertical plane passing through the longitudinal axis of the vehicle or perpendicular to the longitudinal axis of the vehicle. These coefficients may be associated with the data regarding the planar surfaces identified by the sensor, at any time before the step of statistical analysis of these data. This association may thus occur before the data storage step, or after. It is also possible, after the data have undergone statistical analysis, for the weighting coefficients associated therewith to be modified, before a new statistical analysis step.

When the data regarding the orientation of the planar surfaces are associated with weighting coefficients representative of the probability that these planar surfaces have the desired orientation, the step of statistical analysis of these data is carried out taking these coefficients into account.

Thus, the statistical analysis step may comprise searching for the angular orientation obtaining a maximum score, the score for each angular orientation depending on the number of planar surfaces having this angular orientation or a similar orientation, weighted by the weighting coefficient or weighting coefficients associated with each of these planar surfaces.

According to one preferred embodiment, this statistical analysis may be based on a computation of the average and variance of the measurements of the angular orientation of the planar surfaces, weighted by the various weighting coefficients. Thus, the data of a planar surface associated with higher coefficients, which therefore has a higher probability of having the desired orientation, will be given more weight in this statistical analysis.

According to one possible embodiment, the calibrating device sorts the data, during this statistical analysis step, with a view to integrating a measurement into the computation of the predominant planar-surface orientation, or on the contrary to excluding it from this computation, according to various criteria.

Thus, the data corresponding to the orientation of a planar surface may be incorporated or excluded depending on the value of the weighting coefficients associated with them.

These data may also be incorporated or excluded depending on their deviation from the average of the data incorporated beforehand. The magnitude of the acceptable deviation may be set depending on the variance of the data incorporated beforehand. Thus, if the data incorporated beforehand were very consistent with one another, it is more difficult to incorporate into the computation new data that deviate substantially from this average.

The number of data that have been incorporated or excluded beforehand may also be taken into account when deciding to incorporate new data into the average or to exclude them. Thus, if many data have been excluded recently, the criteria for incorporation of new measurements into the computation of the average may be made less selective, to facilitate estimation of a new value should the sensor move.

Those skilled in the art will be able to implement other known statistical methods allowing a predominant planar-surface orientation to be identified among the data stored in the database.

As the inventors have observed, vehicles traveling in a straight line are very commonly being driven beside planar surfaces parallel to their path. The statistical analysis of the orientation of the planar surfaces, with respect to the sensor, must therefore reveal a high number of planar surfaces having the same orientation with respect to the sensor. The predominant planar-surface orientation resulting from this analysis may therefore be presumed parallel to the vertical plane passing through the longitudinal axis of the vehicle.

The basis for this presumption may be stronger when the criteria of selection of the data, or weighting coefficients, are chosen in such a way as to favor, in the search for the predominant planar-surface orientation, planar surfaces having a higher probability of having an orientation parallel to the vertical plane passing through the longitudinal axis of the vehicle.

In contrast, when the criteria of selection of the data, or weighting coefficients, are chosen in such a way as to favor, in the search for the predominant planar-surface orientation, planar surfaces having a higher probability of having an orientation perpendicular to the longitudinal axis of the vehicle, the predominant planar-surface orientation resulting from the statistical analysis may be presumed perpendicular to the longitudinal axis of the vehicle.

Once this predominant planar-surface orientation has been identified with a sufficient probability, the calibrating device may compute the angle that the sensor makes to this orientation presumed parallel, or perpendicular, to the vertical plane passing through the longitudinal axis of the vehicle, and therefore the angle, called the calibration angle, that the sensor makes to the vertical plane passing through the longitudinal axis of the vehicle, or to the plane perpendicular to the longitudinal axis of the vehicle.

It is thus possible, without having to place a test pattern close to the vehicle, to determine the orientation of the sensor with respect thereto. This orientation measurement makes it possible, if necessary, to adapt computation parameters allowing identification of the position of objects in the environment, with respect to the vehicle.

Advantageously, the calibrating device continues this calibration throughout the life of the vehicle. Thus, data corresponding to new planar surfaces are added to its database, as soon as the vehicle is traveling in a straight line. The position of the sensor with respect to the vehicle may thus be constantly monitored, and a variation in this position rapidly taken into account.

Lastly, an aspect of the invention relates to a processor-readable data medium on which is stored a computer program comprising instructions for executing the steps of a calibrating method such as described above.

The data medium may be a non-volatile data medium such as a hard disk, a flash memory or an optical disk for example.

The data medium may be any entity or device capable of storing instructions. For example, the medium may comprise a storage means, such as a ROM, RAM, PROM, EPROM, a CD ROM or even a magnetic recording means, a hard disk for example.

Furthermore, the data medium may be a transmissible medium such as an electrical or optical signal, which is able to be routed via an electrical or optical cable, by radio or by other means.

Alternatively, the data medium may be an integrated circuit, into which the program is incorporated, the circuit being suitable for executing or for being used in the execution of the method in question.

The invention claimed is:

1. A method for calibrating a yaw angle of an environment depth sensor borne by a vehicle, comprising the following steps, implemented continuously:
   a step of storing, in a database, data regarding planar surfaces identified by the environment depth sensor, said data comprising at least information regarding the orientation of said planar surfaces, with respect to said environment depth sensor;
   a step of statistically analyzing said data stored in said database to identify a predominant planar-surface orientation among said data, said predominant planar-surface orientation being parallel to a vertical plane passing through a longitudinal axis of the vehicle, or perpendicular to the longitudinal axis of the vehicle; and
   a step of computing a calibration angle, said calibration angle being computed between said predominant planar-surface orientation and said environment depth sensor, wherein said predominant planar-surface orientation is parallel to the vertical plane passing through the longitudinal axis of the vehicle, or perpendicular to the longitudinal axis of the vehicle.

2. The calibrating method as claimed in claim 1, comprising, before said step of storing data:
   a step of preliminarily selecting data delivered by the environment depth sensor, during which said data to be stored in said database is selected depending on one or more predefined criteria.

3. The calibrating method as claimed in claim 2, wherein the one or more predefined criteria comprises at least one of:
   a speed and/or direction of travel of the vehicle during which said data delivered by said environment depth sensor was detected by said environment depth sensor;
   an angular zone of detection of said environment depth sensor in which said data delivered by said environment depth sensor was detected by said environment depth sensor;
   a number of planar surfaces parallel to a path of the vehicle previously identified in a geographical area in which said data delivered by said environment depth sensor was detected by said environment depth sensor; or an approximate position of an identified planar surface with respect to the vehicle.

4. The calibrating method as claimed in claim 1, comprising, before said step of statistically analyzing said data:

a step of associating at least one weighting coefficient with said data stored in said database.

5. The calibrating method as claimed in claim 4, wherein said step of associating at least one weighting coefficient comprises a step of determining at least one weighting coefficient, based on data delivered by:

said environment depth sensor, said vehicle, an analysis of said data stored in said database, or said identified predominant planar-surface orientation.

6. The calibrating method as claimed in claim 4, wherein, during said step of statistically analyzing said data stored in said database, said predominant planar-surface orientation is identified as an orientation obtaining a maximum score, said maximum score being obtained based on a number of planar surfaces having said predominant planar-surface orientation or a similar orientation, and said maximum score being weighted by at least one weighting coefficient associated with said data.

7. The calibrating method as claimed in claim 1, wherein, during said step of statistically analyzing said data stored in said database, said predominant planar-surface orientation is identified as an average orientation of planar surfaces having data associated with one or more weighting coefficients meeting a minimum threshold.

8. A device for calibrating the yaw angle of an environment depth sensor, comprising:

storing means for storing data delivered by the environment depth sensor, said data comprising at least information regarding the orientation, with respect to said environment depth sensor, of one or more planar surfaces identified by said environment depth sensor;

computing means for performing statistical analysis to identify a predominant planar-surface orientation among the data stored in said storing means; and computing means for computing a calibration angle, said calibration angle being computed between said predominant planar-surface orientation and said environment depth sensor.

9. The calibrating device as claimed in claim 8, further comprising computing means for preliminarily selecting said data delivered by the environment depth sensor based on one or more predefined criteria, said preliminarily selected data to be stored in said storing means.

10. The calibrating device as claimed in claim 9, wherein the one or more predefined criteria comprises at least one of:

a speed and/or direction of travel of the vehicle during which said data delivered by said environment depth sensor was detected by said environment depth sensor;

an angular zone of detection of said environment depth sensor in which said data delivered by said environment depth sensor was detected by said environment depth sensor;

a number of planar surfaces parallel to a path of the vehicle previously identified in a geographical area in which said data delivered by said environment depth sensor was detected by said environment depth sensor; or an approximate position of an identified planar surface with respect to the vehicle.

11. A non-transitory processor-readable data medium on which is stored a computer program comprising instructions for executing the steps of:

storing, in a database, data regarding planar surfaces identified by the environment depth sensor, said data comprising at least information regarding an orientation of said planar surfaces, with respect to said environment depth sensor;

statistically analyzing said data stored in said database to identify a predominant planar-surface orientation among said data, said predominant planar-surface orientation being parallel to a vertical plane passing through a longitudinal axis of the vehicle, or perpendicular to the longitudinal axis of the vehicle; and computing a calibration angle, said calibration angle being computed between said predominant planar-surface orientation and said environment depth sensor, wherein said predominant planar-surface orientation is parallel to the vertical plane passing through the longitudinal axis of the vehicle or perpendicular to the longitudinal axis of the vehicle.

* * * * *